Dec. 24, 1940.                H. S. SHAPIRO                2,226,233
                             ADJUSTABLE COVER
                            Filed Dec. 27, 1938

Harry S. Shapiro
INVENTOR.
BY Clarence E. Threedy
HIS ATTORNEY.

Patented Dec. 24, 1940

2,226,233

UNITED STATES PATENT OFFICE 2,226,233

ADJUSTABLE COVER

Harry S. Shapiro, Chicago, Ill.

Application December 27, 1938, Serial No. 247,799

2 Claims. (Cl. 220—25)

A principal object of the present invention is the provision of an adjustable cover structure particularly suited for use with vents and receptacle openings of various kinds, particularly those provided with interior threading, such as vent pipes and the like.

Viewed from another aspect, the adjustable cover structure of the present invention is intended to replace the type of cover heretofore threaded into a pipe or attaching member, with the object of making the standard cover applicable to different sizes of pipe, procuring a better and more reliable seal by doing away with the threaded engagement of the cover with the support or body with which it is used.

Another object is the provision of an adjustable cover structure including adjustable means for providing a double seal which may be used with different sizes of pipe or opening.

Another object is the provision of an adjustable cover structure including an attaching member provided with detent means yieldingly engaging threading or analogous formations on the interior of the pipe, a cover member, and means adjustably engageable with the attaching member for holding the cover member tightly in closing position.

A further object is the provision of an adjustable cover structure including an attaching member having divergently expansible arms arranged to expand into engagement with the interiorly threaded portion of a piping, and one or more cover members secured in closing position on the pipe or associated structure by means of a bolt passing through the same and adjustably threaded into the attaching member.

Other objects and novel aspects of the invention reside in the various details of construction, as well as the mode of operation, of the parts of the preferred embodiment described hereinafter in conjunction with the annexed drawing, in which:

Fig. 2 is a vertical section of a modified form of cover structure including a plurality of closure members; while

The invention has a variety of applications and for purposes of illustration, two forms of cover structure are shown herein as used in connection with a waste trap or clean-out for a waste line.

Figure 1:
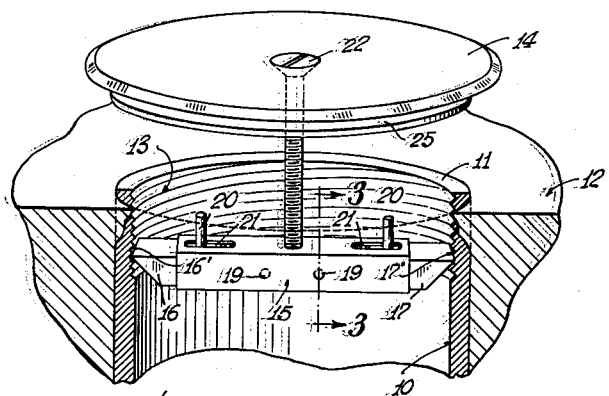
Fig. 1 is a perspective view of one form of closure in use.

In the arrangement of Fig. 1 the body or member, for which the adjustable cover provides a closure, is in the form of a clean-out pipe 10 having a peripheral edge portion 11 set flush in a floor structure 12. This pipe is provided with internal threading 13 adjacent its mouth, and in ordinary practice a cover plate, similar in construction to the cover 14, would be threaded flush against the floor into the pipe 10. The threaded engagement of the cover with the pipe is objectionable for the reason that the threading on both the pipe and cover is susceptible to injury at times when the cover is being removed from or applied to the pipe, and moreover the threading on the piping frequently employed in such installations is susceptible to corrosion, rusting and the like, so that such an arrangement is objectionable as a frequent source of trouble. Moreover, a variety of sizes of cover plate must necessarily be available for replacements in use with different sizes of pipe.

The adjustable cover structure of the present invention overcomes these difficulties as will readily appear from the following description, the structure including an attaching means in the form of a sleeve 15 (see Fig. 2 also) of a length somewhat less than the diameter of the smallest pipe with which the attaching means is to be used, there being a pair of detent fingers 16 and 17 slidably mounted in opposite ends of the sleeve and each provided with a pointed nose portion 16' and 17' respectively, suitable for engagement in the recessed or depressed areas between the threads 13.

Figure 3:
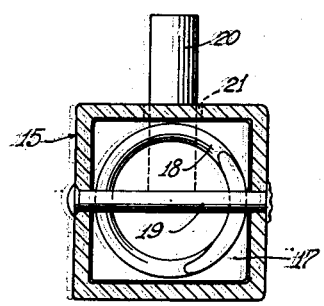
Fig. 3 is a cross section to enlarged scale along line 3—3 of Fig. 1.

The detent fingers are urged outwardly of the sleeve by individual coil springs 18 (Fig. 3) disposed within the sleeve and each bearing at one of its extremities against the corresponding detent finger and at its opposite extremities against one of a pair of stop pins 19 extended through the sleeve on opposite sides of a transverse center line through the same. Each of the detent fingers is provided with a releasing member in the form of a laterally projecting pin 20 extending through a corresponding elongated slot 21 in the sleeve so that each pin may move freely back and forth with its corresponding detent finger, the pins being of a length suitable for engagement by the fingers of the hand so that the detents may be retracted into the sleeve out of engagement with the pipe threading.

The attaching means is first engaged with the pipe or other member 10 by retracting the detent means in the manner aforesaid and inserting the attaching means into the threaded end of the pipe to a suitable depth and thereafter releasing the pins 20 so that the spring means 18 may urge the detent fingers 16 and 17 outwardly into engagement with the threading 13. The cover plate 14 is thereafter secured in position by an attaching element adjustably engaging the attaching means 15, such element in the present instance being a screw 22 passed through the cover plate and threaded into an opening situated centrally in the sleeve 15, the screw 22 being turned up to draw the cover tightly against the opening and being provided with suitable washer means 25 such as will be described in conjunction with the arrangement of Fig. 2.

Figure 2:
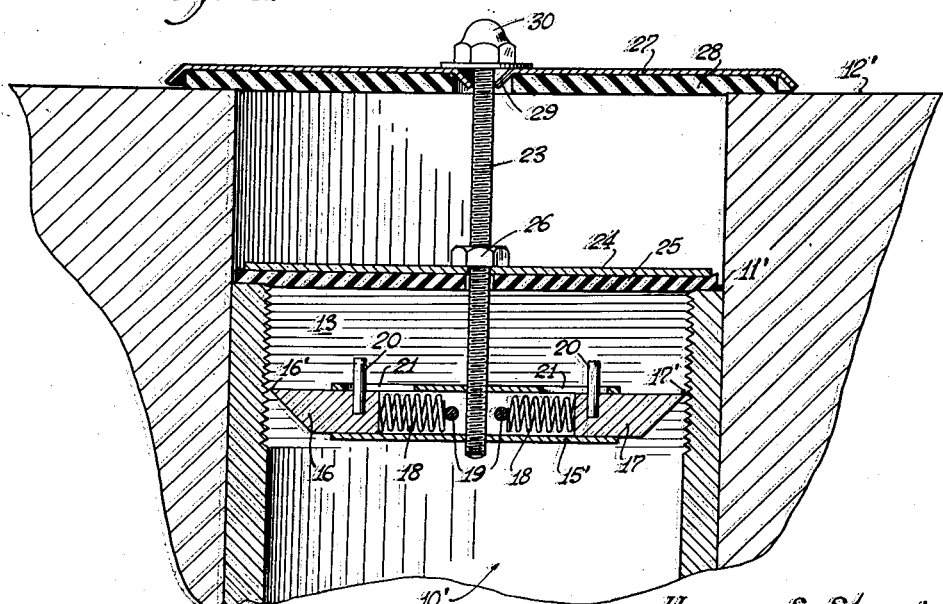

In the modified form of the invention shown in Fig. 2, the clean-out pipe 10' has its peripheral edge 11' disposed appreciably below the floor level 12'. An attaching device 15' constructed substantially as described in conjunction with Fig. 1, is secured within the mouth of the pipe in the manner already described, and an attaching element or bolt 23 is passed through a first cover member 24 and threaded into the attaching member or sleeve, an adjusting nut 26 thereafter being turned against the first or inner cover plate to urge the latter and its washer 25 firmly against the rim of the pipe, thereby providing a first seal. Thereafter a second or outer cover plate 27 is fitted into plate over the opening with its washer 28 flush against the floor, and an upper end portion of the bolt 23 projecting through a suitable opening 29 in the plate for engagement with a finish nut 30 which is drawn up tightly to provide the second seal in tandem with the first.

It will be observed that one feature of adjustability resides in the expansible detent means 16—17 which makes it possible for the attaching member 15 to supportably engage pipes of different diameter. Another feature of adjustability resides in the threaded or analogous engagement of the attaching members or bolts 22 and 23 with their respective mounting or attaching means whereby the cover plates may be secured in position regardless of the depth at which the attaching sleeves are positioned. It will be observed that the extremities of the detent fingers 16 and 17 are beveled to provide the thread-engaging formations or edges 16' and 17', this beveling being directed so that engagement thereof with the rim portions of the pipe when the attaching or mounting sleeve is inserted will assist in camming the detent fingers into the sleeve to further facilitate insertion of the attaching or mounting sleeve in the pipe.

It will also be appreciated that the adjustable closure is applicable to any opening, whether in a pipe or some other body, in which the divergently expanding detent members 16 and 17 may become engaged to function analogously to their mounting in a pipe as illustrated herein.

The objects and advantages of the invention may be realized in other forms of construction, and the invention is not restricted to any of the specific details recited herein for purposes of illustration, but is to be broadly interpreted in accordance with the provisions of the appended claims.

Having thus described my invention, what I claim as new and desire to protect by Letters Patent is:

1. In a device of the class described, means for attaching a cover plate over a vent opening, said means including a sleeve member adapted to fit into said opening and extend diametrically across the same, detent members movable into and out of the opposite ends of said sleeve member, spring means in said sleeve member urging said detent members outwardly thereof against the inner surface portions of said opening, each detent being provided with a releasing member projecting transversely of the movement thereof toward the entrance to said opening through a slot in said sleeve elongated in the direction of movement of the detent members, each said detent member having a beveled nose portion for engagement with threading within said opening, and means for interconnecting said cover plate with said attaching means.

2. In a device of the class described, means for removably securing a cover plate in covering position on a vent pipe or the like, said means including a square sleeve adapted to fit diametrically into said pipe, detent members of square cross section slidable into and out of opposite ends of said sleeve and each having a beveled outer nose portion adapted to be urged into holding engagement with inner portions of said pipe, each detent being provided with a releasing pin extended transversely of the movement thereof through an elongated slot in the sleeve extending in the direction of movement of the detent, a compression spring for each detent and each said spring having one end bearing against the corresponding detent and an opposite end bearing against lateral pin means secured in opposite wall portions of said sleeve, said pin means for each spring being spaced on opposite sides of the center of said sleeve, and bolt means threaded into the center of said sleeve in the region between said pin means for attaching said cover plate to the sleeve.

HARRY S. SHAPIRO.